United States Patent
Takashima et al.

(10) Patent No.: US 9,359,521 B2
(45) Date of Patent: Jun. 7, 2016

(54) MEMBER FOR VEHICLE AND MANUFACTURING PROCESS FOR THE SAME

(75) Inventors: Hiroaki Takashima, Kariya (JP); Kyoko Kumagai, Kariya (JP); Hidetaka Hayashi, Kariya (JP); Tetsuya Mitsuoka, Kariya (JP); Naoharu Ueda, Kariya (JP); Hisashi Muramatsu, Kariya (JP); Kazumasa Inata, Nagoya (JP); Takeshi Fujita, Nagoya (JP); Yasuyuki Sanai, Nagoya (JP); Eiichi Okazaki, Nagoya (JP); Satoshi Yoneda, Nagoya (JP); Naomasa Furuta, Nagoya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 63 days.

(21) Appl. No.: 14/343,336

(22) PCT Filed: Aug. 27, 2012

(86) PCT No.: PCT/JP2012/005354
§ 371 (c)(1),
(2), (4) Date: Mar. 6, 2014

(87) PCT Pub. No.: WO2013/035263
PCT Pub. Date: Mar. 14, 2013

(65) Prior Publication Data
US 2015/0044477 A1 Feb. 12, 2015

(30) Foreign Application Priority Data
Sep. 6, 2011 (JP) .................. 2011-194305

(51) Int. Cl.
*C09D 133/14* (2006.01)
*C08K 5/3492* (2006.01)
*C08J 7/04* (2006.01)

(52) U.S. Cl.
CPC ............. *C09D 133/14* (2013.01); *C08J 7/045* (2013.01); *C08K 5/3492* (2013.01); *C08J 2475/16* (2013.01); *Y10T 428/31547* (2015.04)

(58) Field of Classification Search
CPC ............... C09D 133/14; C08K 5/3492; Y10T 428/31547; C08J 7/045; C08J 2475/16
USPC ........................................ 428/423.1; 427/515
See application file for complete search history.

(56) References Cited

U.S. PATENT DOCUMENTS 6,306,502 B1   10/2001   Fukushima et al.
2014/0242395 A1*  8/2014  Takashima et al. ........ 428/423.1

FOREIGN PATENT DOCUMENTS

EP    0869154 A1    10/1998
EP    2371871 A1    10/2011

(Continued)

OTHER PUBLICATIONS

Communication dated Oct. 21, 2014, issued by the German Patent Office in counterpart Application No. 112012003705.7.

(Continued)

*Primary Examiner* — Thao T Tran
(74) *Attorney, Agent, or Firm* — Sughrue Mion, PLLC

(57) ABSTRACT

A member for vehicle according to the present invention includes a resinous substrate, and a protective film being formed on a surface of the resinous substrate partially at least. The protective film is made by curing a curing-type coating-agent composition containing: Component (A) (e.g., an isocyanuric ring-containing urethane (meth)acrylate compound) in an amount of from 20 to 80 parts by mass; Component (B) (e.g., an isocyanuric ring-containing tri (meth)acrylate compound free from any urethane bond) in an amount of from 10 to 70 parts by mass; Component (C) including a specific organosilicon compound in an amount of from 5 to 35 parts by mass; a radical-polymerization initiator serving as Component (D) in an amount of from 0.1 to 10 parts by mass; an ultraviolet absorber serving as Component (E) in an amount of from 1 to 12 parts by mass; and an organic solvent serving as Component (F) in an amount of from 10 to 1,000 parts by mass; with respect to a sum of the Component (A), the Component (B), and the Component (C) being taken as 100 parts by mass. Said protective film demonstrates excellent wear resistance and weatherability.

13 Claims, 1 Drawing Sheet

(56) References Cited

FOREIGN PATENT DOCUMENTS

| JP | 2000-063701 | A |   | 2/2000 |
| --- | --- | --- | --- | --- |
| JP | 2001-214122 | A |   | 8/2001 |
| JP | 3747065 | B2 |   | 2/2006 |
| JP | 2011088054 | A | * | 5/2011 |
| JP | 2011-219691 | A |   | 11/2011 |
| JP | 2011256344 | A |   | 12/2011 |
| WO | 97/11129 | A1 |   | 3/1997 |
| WO | 2010067876 | A1 |   | 6/2010 |
| WO | 2011/048775 | A1 |   | 4/2011 |
| WO | 2011/155138 | A1 |   | 12/2011 |

OTHER PUBLICATIONS

Communication dated Oct. 21, 2014, issued by the German Patent Office in counterpart Application No. 112012003707.3.
Communication dated Oct. 21, 2014, issued by the German Patent Office in counterpart Application No. 112012003704.9.
Written Opinion of PCT/JP2012/005354 dated Nov. 27, 2012.
Communication dated Jul. 1, 2015, issued by the U.S. Patent and Trademark Office in corresponding U.S. Appl. No. 14/343,332.

* cited by examiner

MEMBER FOR VEHICLE AND MANUFACTURING PROCESS FOR THE SAME

CROSS REFERENCE TO RELATED APPLICATIONS

This is a National Stage of International Application No. PCT/JP2012/005354 filed Aug. 27, 2012, claiming priority based on Japanese Patent Application No. 2011-194305 filed Sep. 6, 2011, the contents of all of which are incorporated herein by reference in their entirety.

TECHNICAL FIELD

The present invention relates to a member for vehicle, such as interior/exterior materials for vehicle, outside plates for vehicle and resinous windows, for which high wear resistance and weatherability are required, and a manufacturing process for the same.

BACKGROUND ART

Resinous materials, among them, transparent resinous materials, which are represented by polycarbonate or the like, have been utilized widely in various applications while taking advantages of such characteristics as being low specific gravity as well as lightweight, being processed easily, and being strong against shocks compared with inorganic glass. Recently, from such a viewpoint as saving petroleum resources or reducing carbon dioxide emissions, the momentum for upgrading mileage or fuel consumption has been enhancing by means of substituting plastics for window glasses and interior/exterior materials for automobile in order to make them lightweight.

On the contrary, resinous materials have the following disadvantages: their surface is likely to be damaged so that the gloss or transparency is likely to be lost; they are likely to be damaged by organic solvents; or moreover, they are poor in the weatherability (e.g., the photo stability against ultraviolet rays, etc.) and heat resistance; and the like. Window glasses for automobile are often exposed to sunlight for a long period of time. Consequently, in the case of using resinous materials for members for automobile, it is necessary to impart them wear resistance and weatherability by means of covering their surface by a protective film, and so forth.

As such a protective film that is good in terms of the wear resistance and weatherability, a hard coating layer is given which is made by curing a photo curing-type coating-agent composition, for instance.

As a light curing-type coating-agent composition being provided with both wear resistance and weatherability combinedly, a composition for forming wear-resistant coating has been known (see Patent Literature No. 1). The composition comprises colloidal silica fine particles, a monomer mixture, and a photo-polymerization initiator in a specific proportion, respectively. The colloidal silica fine particles include a silane compound having a methacryloyloxy group, an acryloyloxy group or a vinyl group that is modified superficially in a predetermined weight proportion. The monomer mixture includes a poly[(meth)acryloyloxyalkyl]isocyanurate, and a urethane poly(meth)acrylate, which has an alicyclic framework.

Moreover, another coating-agent composition has also been known (see Patent Literature No. 2). The coating-agent composition includes the following in a specific proportion, respectively: a poly(meth)acrylate of mono- or poly-pentaerythritol; a urethane poly(meth)acrylate, which has at least two radically-polymerizable unsaturated double bonds; a poly[(meth)acryloyloxyalkyl](iso)cyanurate; an ultraviolet absorber; a hindered amine-based light stabilizer; and a photo-polymerization initiator.

An example is also available in which a thermal curing-type coating-agent composition is used. Patent Literature No. 3 discloses a plastic article. In the plastic article, a first layer, which is made by curing a thermo-curing undercoating-agent composition being good in the weatherability, is disposed on a surface of a resinous substrate; and a second layer, which is made by curing a thermo-curing coating-agent composition being good in the wear resistance, is disposed on the first layer.

RELATED TECHNICAL LITERATURE

Patent Literature

Patent Literature No. 1: Japanese Patent Gazette No. 3747065;
Patent Literature No. 2: Japanese Unexamined Patent Publication (KOKAI) Gazette No. 2000-063701; and
Patent Literature No. 3: Japanese Unexamined Patent Publication (KOKAI) Gazette No. 2001-214122

SUMMARY OF THE INVENTION

Assignment to be Solved by the Invention

In the plastic article being set forth in Patent Literature No. 3, the wear resistance, and the weatherability are made compatible with each other at higher level. However, thermal curing-type compositions have the following problems: they require a large amount of energy in order to form cured films, compared with photo curing-type compositions; and they are poor in terms of efficiency, because longer times are needed to heat them; and the like.

Moreover, they are not desirable from the viewpoint of productivity, because the number of processing steps increases when not only a coating-agent composition but also an undercoating-agent composition are employed as done in Patent Literature No. 3. Hence, a coating-agent composition, which makes it possible to form protective films that demonstrate wear resistance and weatherability sufficiently without using any undercoating-agent composition, has been desired eagerly.

Using a photo curing-type composition makes production with good efficiency feasible. Although the above-mentioned urethane poly(meth)acrylate having an alicyclic framework is a component that improves the weatherability of hard coating layer, it is insufficient with regard to the wear resistance. In the respective examples according to Patent Literature No. 1, colloidal silica particles (or ultraviolet-curing silicone), which are modified superficially with a silane compound having a methacryloyloxy group, are employed along with this urethane poly(meth)acrylate. However, the resulting wear resistance cannot be said to be sufficient, and moreover it is unclear with regard to the weatherability after 2,000 hours or later.

On the other hand, a hard coating layer, which is made by curing the above-mentioned poly(meth)acrylate of mono- or poly-pentaerythritol, exhibits a high hardness. Hence, in Patent Literature No. 2, this component is used in combination with a urethane poly(meth)acrylate having at least two radically-polymerizable unsaturated double bonds, namely, a component that upgrades weatherability. However, as a result of investigations done by the present inventors, it was understood that it is not possible to withstand accelerated tests for much longer periods of time by simply using a component for upgrading wear resistance in combination with another component for upgrading weatherability.

In other words, even when a hard coating layer is formed on a surface of a resinous substrate with use of the above-mentioned photo curing-type coating-agent composition, it is difficult to make the resulting wear resistance and weatherability compatible with each other at higher level.

In view of these problematic issues, the present invention aims at providing a member for vehicle that comprises a protective film, which demonstrates excellent wear resistance and weatherability, on a surface of a resinous substrate.

Means for Solving the Assignment

As a result of the present inventors' earnest investigations, they found out that protective films being made by curing a composition is excellent in terms of transparency, wear resistance, and weatherability, composition in which the following are used combinedly in a specific proportion, respectively: an isocyanuric-ring containing urethane (meth)acrylate compound; an isocyanuric-ring containing tri(meth)acrylate compound being free from any urethane bond; and a specific organosilicon compound; and additionally to which additives are added in an appropriate amount, respectively. Thus, they arrived at completing the present invention.

Specifically, a member for vehicle according to the present invention is characterized in that:

the member comprises a resinous substrate, and a protective film being formed on a surface of the resinous substrate partially at least;

said protective film is made by curing a curing-type coating-agent composition containing:

following Component (A) in an amount of from 20 to 80 parts by mass;

following Component (B) in an amount of from 10 to 70 parts by mass;

following Component (C) in an amount of from 5 to 35 parts by mass;

a radical-polymerization initiator serving as Component (D) in an amount of from 0.1 to 10 parts by mass;

an ultraviolet absorber serving as Component (E) in an amount of from 1 to 12 parts by mass; and an organic solvent serving as Component (F) in an amount of from 10 to 1,000 parts by mass;

with respect to a sum of the Component (A), the Component (B) and the Component (C) being taken as 100 parts by mass.

Component (A):

an isocyanuric ring-containing urethane (meth)acrylate compound being expressed by following General Formula (1);

(Chemical Formula 1)

(In General Formula (1), each of $R^1$, $R^2$ and $R^3$ expresses a divalent organic group whose number of carbon atoms is from 2 to 10 independently; and each of $R^4$, $R^5$ and $R^6$ expresses a hydrogen atom, or a methyl group independently.);

Component (B):

an isocyanuric ring-containing tri(meth)acrylate compound being free from any urethane bond that is expressed by following General Formula (2);

(Chemical Formula 2)

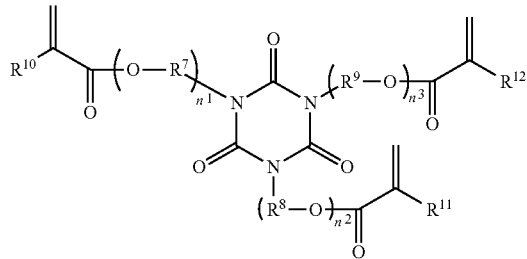

(2)

(In General Formula (2), each of $R^7$, $R^8$ and $R^9$ expresses a divalent organic group whose number of carbon atoms is from 2 to 10 independently; each of $R^{10}$, $R^{11}$ and $R^{12}$ expresses a hydrogen atom, or a methyl group independently; each of $n^1$, $n^2$ and $n^3$ expresses a number of from 1 to 3 independently; and $n^1+n^2+n^3$=from 3 to 9.);

Component (C):

an organosilicon compound being obtainable by subjecting a silicon compound (c1) being expressed by following General Formula (3) and another silicon compound (c2) being expressed by following General Formula (4) to hydrolytic copolycondensation in a proportion of from 0.3 to 1.8 mol of the compound (c2) with respect to 1 mol of the compound (c1);

(Chemical Formula 3)

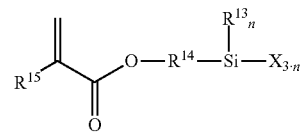

(3)

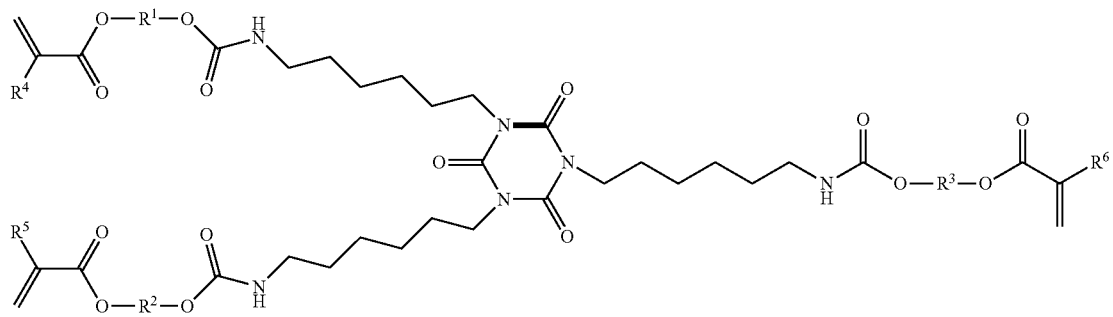

(1)

(In General Formula (3), $R^{13}$ is an organic group having an alkyl group whose number of carbon atoms is from 1 to 6, an aralkyl group whose number of carbon atoms is from 7 to 10, or an aryl group whose number of carbon atoms is from 6 to 10; $R^{14}$ is a divalent saturated hydrocarbon group whose number of carbon atoms is from 1 to 6; $R^{15}$ is a hydrogen atom, or a methyl group; "X" is a hydrolyzable group; "X"s can be identical with each other, or can be distinct from one other; and "n" is 0 or 1.);

$$SiY_4 \qquad (4)$$

(In General Formula (4), "Y" is a siloxane-bond generation group; and "Y"s may be identical with each other, or may be distinct from one other.)

It is preferable to employ a photo radical-polymerization initiator serving as Component (D) and then form protective films by means of curing by irradiating it with light. By means of curing the composition by irradiating it with light, it becomes feasible to cure it with lower energy in a shorter period of time. Moreover, by specifying a blending proportion of the ultraviolet absorber and furthermore a type of the ultraviolet absorber, the curing progresses satisfactorily even when curing the composition by irradiating it with light. Thus, protective films are obtainable which are excellent in terms of transparency, and in which the wear resistance and weatherability are made compatible with each other.

Effect of the Invention

The member for vehicle according to the present invention demonstrates excellent wear resistance and weatherability, because it comprises a protective film, which is obtainable by curing the specific curing-type coating-agent composition, on a surface of the resinous substrate.

MODES FOR CARRYING OUT THE INVENTION

Figure 1:
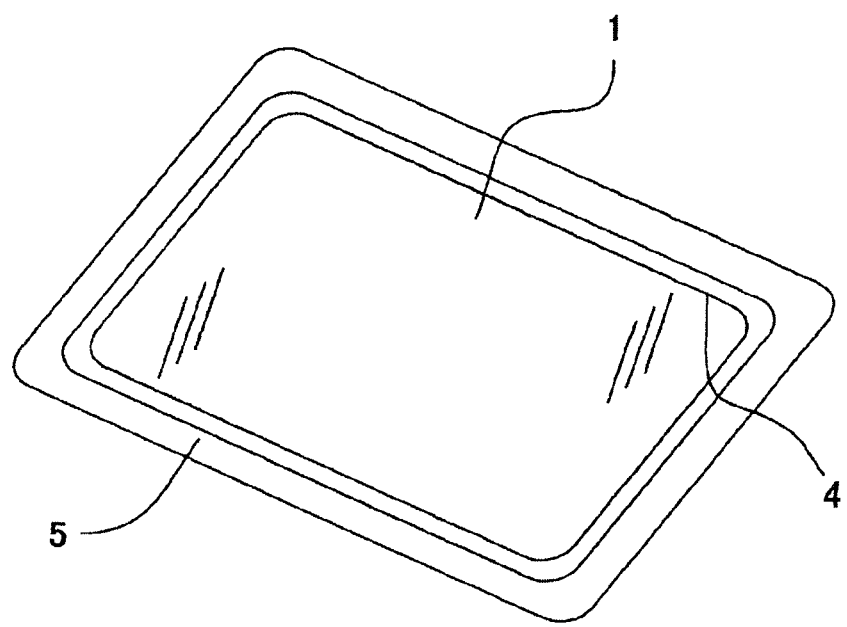
FIG. 1 is a perspective diagram that schematically illustrates a sunroof in which a member for vehicle according to the present invention is used.

Hereinafter, explanations will be made on some of the best modes for performing the member for vehicle according to the present invention. Note that, unless otherwise specified, ranges of numeric values, "from 'p' to 'q'" being set forth in the present description, involve the lower limit, "p," and the upper limit, "q," in those ranges. And, the other ranges of numeric values are composable by arbitrarily combining values that involve not only those upper-limit values and lower-limit values but also numerical values that are enumerated in the following examples.

A member for vehicle according to the present invention comprises a resinous substrate, and a protective film that is formed on a surface of the resinous substrate partially at least. The protective film is made by curing a curing-type coating-agent composition that will be explained hereinafter.

(Curing-Type Coating-Agent Composition)

A curing-type coating-agent composition (being abbreviated to as "composition" whenever appropriate) contains: Component (A) in an amount of from 20 to 80 parts by mass; Component (B) in an amount of from 10 to 70 parts by mass; Component (C) in an amount of from 5 to 35 parts by mass; a radical-polymerization initiator serving as Component (D) in an amount of from 0.1 to 10 parts by mass; an ultraviolet absorber serving as Component (E) in an amount of from 1 to 12 parts by mass; and an organic solvent serving as Component (F) in an amount of from 10 to 1,000 parts by mass; with respect to a sum of following Component (A), following Component (B) and following Component (C) being taken as 100 parts by mass. Hereinafter, explanations will be made on details of the composition and its respective components.

Note that, in the present description, an acryloyl group or a methacryloyl group is expressed as a "(meth)acryloyl group." Moreover, acrylate or methacrylate is expressed as "(meth)acrylate."

Component (A)

Component (A) is an isocyanuric ring-containing urethane (meth)acrylate compound being expressed by following General Formula (1).

(Chemical Formula 4)

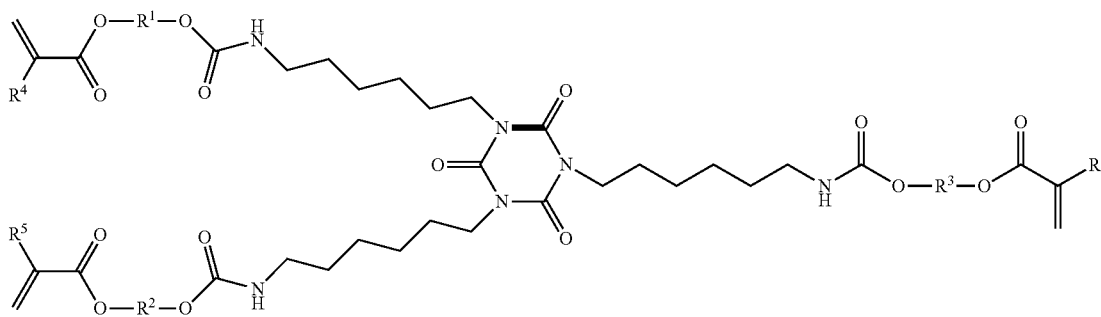

(1)

In General Formula (1), each of $R^1$, $R^2$ and $R^3$ expresses a divalent organic group whose number of carbon atoms is from 2 to 10 independently. As for a divalent organic group whose number of carbon atoms is from 2 to 10, an alkylene group, such as an ethylene group, a trimethylene group, a propylene group or a tetramethylene group, whose number of carbon atoms is from 2 to 4 is preferable. Moreover, compounds are also involved, compounds in which the compounds according to General Formula (1) that have one of these groups have been modified with ε-caprolactone. In this case, the divalent organic group whose number of carbon atoms is from 2 to 10 involves —OCOCH$_2$CH$_2$CH$_2$CH$_2$—. Of these, those in which all of R$^1$, R$^2$ and R$^3$ can respectively be a tetramethylene group are especially preferable, because protective films are obtainable which are excellent in terms of wear resistance and weatherability especially.

In General Formula (1), each of R$^4$, R$^5$ and R$^6$ expresses a hydrogen atom, or a methyl group independently. Compounds, in which all of R$^4$, R$^5$ and R$^6$ can respectively be a hydrogen atom, are especially preferable, from the viewpoint that the resulting compositions turn into ones that are excellent in terms of curability.

Compound (A) can be synthesized by means of addition reaction between a nurate-type trimer of hexamethylene diisocyanate and hydroxyalkyl (meth)acrylate or its caprolactone-modified product. Although the addition reaction is feasible even without any catalyst, it is also allowable to add a tin-based catalyst, such as dibutyltin dilaurate, or an amine-based catalyst, such as triethylamine, and the like, in order to advance the reaction efficiently.

A content proportion of Component (A) in the composition can be from 20 to 80 parts by mass, more preferably, from 30 to 70 parts by mass, with respect to a sum of Component (A), Component (B) and Component (C) being taken as 100 parts by mass. By setting a content proportion of Component (A) at from 20 to 80 parts by mass, protective films are obtainable which are excellent in terms of wear resistance and weatherability.

Component (B)

Component (B) is an isocyanuric ring-containing tri(meth)acrylate compound being free from any urethane bond that is expressed by following General Formula (2).

(Chemical Formula 5)

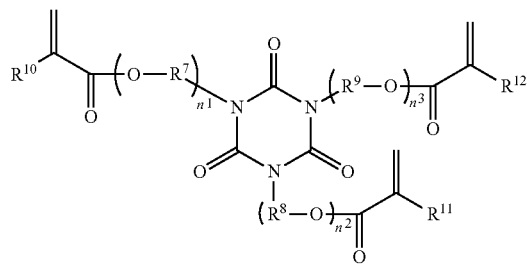

(2)

In General Formula (2), each of R$^7$, R$^8$ and R$^9$ expresses a divalent organic group whose number of carbon atoms is from 2 to 10 independently. As for a divalent organic group whose number of carbon atoms is from 2 to 10, an alkylene group, such as an ethylene group, a trimethylene group, a propylene group or a tetramethylene group, whose number of carbon atoms is from 2 to 4 is preferable.

Moreover, compounds are also involved, compounds in which the compounds according to General Formula (2) that have one of these groups have been modified with ϵ-caprolactone. In this case, the divalent organic group whose number of carbon atoms is from 2 to 10 involves —OCOCH$_2$CH$_2$CH$_2$CH$_2$CH$_2$—. Of these, those in which all of R$^7$, R$^8$ and R$^9$ can respectively be an ethylene group are especially preferable, because it is possible to obtain protective films that are excellent in terms of wear resistance and weatherability especially.

In General Formula (2), each of R$^{10}$, R$^{11}$ and R$^{12}$ expresses a hydrogen atom, or a methyl group independently. Compounds, in which all of these can respectively be a hydrogen atom, are especially preferable, from the viewpoint that the resulting compositions turn into ones that are excellent in terms of curability.

In General Formula (2), each of n$^1$, n$^2$ and n$^3$ expresses a number of from 1 to 3 independently. However, n$^1$+n$^2$+n$^3$=from 3 to 9. As for n$^1$, n$^2$ and n$^3$, they can preferably be 1, respectively. As for n$^1$+n$^2$+n$^3$, it can preferably be 3.

Compound (B) can preferably be produced by reacting an alkylene oxide adduct of isocyanuric acid with a (meth)acrylic acid. Note that n$^1$+n$^2$+n$^3$ herein expresses an average number of alkylene oxides per one molecule of Compound (B).

A content proportion of Component (B) in the composition can be from 10 to 70 parts by mass, more preferably, from 20 to 60 parts by mass, with respect to a sum of Component (A), Component (B) and Component (C) being taken as 100 parts by mass. By setting a content proportion of Component (B) at 10 parts or more, it is possible to make the initial adhesiveness between a resinous substrate and the resulting protective films satisfactory; and, by setting it at from 10 to 70 parts by mass, protective films are obtainable which are excellent in terms of wear resistance and weatherability.

Component (C)

Component (C) is an organosilicon compound being obtainable by subjecting a silicon compound (c1) and another silicon compound (c2) whose structures differ one another to hydrolytic copolycondensation.

A silicon compound (c1) is expressed by following General Formula (3).

(Chemical Formula 6)

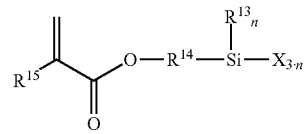

(3)

In General Formula (3), R$^{13}$ is an organic group having an alkyl group whose number of carbon atoms is from 1 to 6, an aralkyl group whose number of carbon atoms is from 7 to 10, or an aryl group whose number of carbon atoms is from 6 to 10.

Among those above, an alkyl group whose number of carbon atoms is from 1 to 6 is preferable; and a methyl group is more preferable, from the viewpoint that obtainable protective films are good in terms of wear resistance.

R$^{14}$ is a divalent saturated hydrocarbon group whose number of carbon atoms is from 1 to 6, and an alkylene group is preferable. As for an alkylene group, a trimethylene group is more preferable, and is preferred not only because protective films being excellent in terms of wear resistance are obtainable but also from the viewpoint of raw-material cost. R$^{15}$ is a hydrogen atom, or a methyl group.

"X" is a hydrolyzable group, and "X"s may be identical with each other, or may be distinct from one another. As for a hydrolyzable group, various groups are feasible as far as they are a group having hydrolyzability. To be concrete, the following can be given: a hydrogen atom, an alkoxy group, a cycloalkoxy group, an aryloxy group, and an arylalkoxy group. Even among these, an alkoxy group is preferable, and an alkoxy group whose number of carbon atoms is from 1 to 6 is more preferable. As for concrete examples of the alkoxy group, the following can be given: a methoxy group, an ethoxy group, a propoxy group, a butoxy group, a pentyloxy group, and hexyloxy group.

Moreover, "n" is 0 or 1, and can preferably be 0, from the viewpoint of the wear resistance of the resulting protective films.

In General Formula (3), as for concrete examples of a compound whose "n" is 0 and "X" is an alkoxy group, one of the preferable compounds, the following can be given: 2-(meth)acryloyloxy ethyltriethoxysilane, 3-(meth)acryloyloxy propyltrimethoxysilane, and 3-(meth)acryloyloxy propylethyltriethoxysilane.

A silicon compound (c2) is expressed by following General Formula (4).

$$SiY_4 \qquad (4)$$

In General Formula (4), "Y" is a siloxane-bond generation group, and "Y"s within a molecule may also be identical with each other, or may even be distinct from one another.

As for a siloxane-bond generation group, an alkoxy group is preferable. As for preferred examples of the alkoxy group, an alkoxy group, such as a methoxy group, an ethoxy group, a n-propoxy group, an iso-propoxy group, a n-butoxy group and a sec-butoxy group, whose number of carbon atoms is from 1 to 4 can be given.

Preferred concrete examples of compound (c2) can be alkoxysilane compounds, such as tetra-n-propoxysilane, tri-methoxy-n-propoxysilane, dimethoxy-di-n-propoxysilane, and methoxy-tri-n-propoxysilane, which have a n-propoxy group.

A n-propoxy group-containing alkoxysilane compound may also be one type of the compounds, or may even be a mixture of the compounds having a n-propoxy group and the other alkoxy groups.

Although it is also possible to employ a mixture of n-propoxy group-containing alkoxysilane compounds by mixing plural species of the components, it is even possible to employ those having been produced by means of alcohol exchange as they are. For example, it is possible to obtain one of the mixtures by subjecting a compound (namely, tetramethoxysilane, for instance), which is a silicon compound being expressed by aforementioned General Formula (4) and which does not have any n-propoxy group, to an alcohol-exchange reaction in 1-propanol. Moreover, it is possible to use reaction products having been obtained by means of this reaction as they are.

A synthesis of Compound (C) may be done by subjecting aforementioned silicon compound (c1) and aforementioned silicon compound (c2), which are set at a predetermined proportion respectively, to hydrolytic copolycondensation under an alkaline condition. Hereinafter, a step in which this hydrolytic copolycondensation is carried out will be labeled a "first step."

A proportion between silicon compound (c1) and silicon compound (c2) can be from 0.3 to 1.8 mol of silicon compound (c2), preferably, from 0.8 to 1.8 mol thereof, more preferably, from 1 to 1.8 mol thereof, with respect to 1 mol of silicon compound (c1). Reacting them one another in this range makes the hydrolytic copolycondensation proceed satisfactorily, so that it is possible to efficiently produce Compound (C) without causing any gelation to occur during the reaction, and after the reaction. Component (C) being produced without ever undergoing gelation upgrades the dispersibility when being mixed as a composition, and eventually upgrades the appearance of the resulting protective films.

It is preferable that the aforementioned first step can be a reaction under an alkaline condition, and it is advisable that the pH of a reaction liquid may be a value exceeding 7. The pH of a reaction liquid can preferably be 8 or more, more preferably, the pH can be 9 or more. Note that the upper limit is usually pH 13. By means of setting up one of the aforementioned pHs in the reaction system, it is possible to produce Component (C) being excellent in terms of preservation stability with a higher yield.

Organosilicon compounds, which are obtainable by subjecting them to the hydrolytic copolycondensation under an acidic condition (i.e., less than pH 7), are not preferable, because they turn into ones which are poor in terms of preservation stability and because they might possibly undergo gelation during storage depending on reaction conditions, and so on.

Moreover, under a neutral condition (i.e., at around pH 7), the hydrolytic copolycondensation reaction is less likely to proceed, so that it is not possible to efficiently produce the present organosilicon compound.

It is possible to set condensed ratios of compound (c1) and compound (c2) in the first step at 92% or more, more preferably, from 95% or more, much more preferably, 98% or more, respectively. Although it is most preferable that all of the siloxane-bond generation groups, including the hydrolyzable groups, can be condensed virtually, the upper limit of the condensed ratios is usually 99.9%.

Production processes, and the like, under acidic conditions, as well as processes for producing organosilicon compound have been known, however, it has been difficult to react the two, compound (c1) and compound (c2), in the raw-material compounds uniformly one another, and they have been those in which gels are likely to arise. Consequently, a method for avoiding gelation has been known in which a silicon compound (hereinafter, being referred to as an "'M' monomer") having one siloxane-bond generation group only, such as trimethylalkoxysilane or hexamethyldisiloxane, is caused to act as a terminal-end sealant.

However, although it is even possible to avoid gelation by combinedly using an "M" monomer in a predetermined amount or more, the inorganic qualities of obtainable organosilicon compounds tend to decline.

On the contrary, being a reaction under an alkaline condition as described above leads to making it possible to cause compound (c1) and compound (c2) to undergo copolycondensation, without ever causing them to undergo gelation. Besides that, since the resulting inorganic qualities can be maintained, such an advantage can be taken effect as not causing the wear resistance of protective films, which are obtainable from the resultant composition, to decline.

Component (C) is one which is produced by said first step that is indispensable, however, it is possible to further include the following steps, if needed:

Second Step: a step of neutralizing a reaction liquid being obtained at the first step by means of acid;

Third Step: a step of removing volatile components from a neutralized liquid being obtained at the second step;

Fourth Step: a step of dissolving Organosilicon Compound (C) in an organic solvent for washing by mixing and contacting a condensate being obtained at the third step and the organic solvent for washing one another;

Fifth Step: a step of obtaining an organic solution including Organosilicon Compound (C) after washing an organic-system liquid being obtained at the fourth step by means of water; and Sixth Step: a step of removing volatile components from the organic solution being obtained at the fifth step.

It is possible to add a polymerization inhibitor, which inhibits the polymerization of (meth)acryloyl group, to at least one of the above-mentioned reaction systems, namely, the reaction liquid, the neutralized liquid, the organic-system liquid and the organic solution that include Component (C).

As for the production process for Component (C), it is preferable to include the first step, the second step, and the fifth step at least.

A content proportion of Component (C) in the composition can be from 5 to 35 parts by mass, or can more preferably be from 10 to 30 parts by mass, with respect to a sum of Component (A), Component (B) and Component (C) being taken as 100 parts by mass.

By setting the content proportion of Component (C) at from 5 to 35 parts by mass, it is possible to adapt the composition into one from which protective films that are excellent in terms of wear resistance and weatherability are obtainable. When the proportion of Component (C) is 5 parts by mass or more, the wear resistance of the resulting protective films upgrades. However, when Component (C) is present too much, the weatherability declines because the resultant protective films become likely to contract, or because decompositions of organic segments in the resulting protective films become quick.

Component (D)

Radical-Polymerization Initiator

Component (D) is a radical-polymerization initiator, and it is possible to employ various compounds for it.

When a photo radical-polymerization initiator is employed as Component (D), the resulting composition works as a light curing-type coating-agent composition, and is cured by means of light irradiation. When a thermal radical-polymerization initiator is used as Component (D), the resultant composition works as a thermal curing-type coating-agent composition, and is cured by means of heating.

It is preferable that the composition can be a light curing-type coating-agent composition in which a photo radical-polymerization initiator is employed as Component (D), from such a viewpoint that it makes curing with lower energy and for a shorter period of time feasible, or it is excellent in terms of curability, and the like.

As for concrete examples of the photo radical-polymerization initiator, the following can be given: acetophenone based compounds, such as 2,2-dimethoxy-1,2-diphenylethane-1-one, 1-hydroxycyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, 2-methyl-1-[4-(methylthio)phenyl]-2-morpholinopropane-1-one, 2-benzyl-2-dimethylamino-1-(4-morpholinophenyl)-butane-1-one, diethoxyacetophenone, oligo{2-hydroxy-2-methyl-1-[4-(1-methylvinyl)phenyl]propanone} and 2-hydroxy-1-{4-[4-(2-hydroxy-2-methylpropionyl)benzyl]phenyl}-2-methyl-propane-1-one; benzophenone-based compounds, such as benzophenone, 4-phenylbenzophenone, 2,4,6-trimethylbenzophenone and 4-benzoyl-4'-methyl-diphenylsulfide; α-ketoester-based compounds, such as methyl benzoylformate, 2-(2-oxo-2-phenylacetoxyethoxy)ethyl ester of oxyphenyl acetic acid and 2-(2-hydroxyethoxy)ethyl ester of oxyphenyl acetic acid; phosphine oxide-based compounds, such as 2,4, 6-trimethylbenzoyl diphenyl phosphine oxide, bis(2,4,6-trimethylbenzoyl)-phenylphosphine oxide, bis(2,6-dimethoxybenzoyl)-2,4,4-trimethylpentyl phosphine oxide; benzoin-based compounds, such as benzoin, benzoin methyl ether, benzoin ethyl ether, benzoin isopropyl ether and benzoin isobutyl ether; titanocene-based compounds; acetophenone/benzophenone-hybrid-based photo initiators, such as 1-[4-(4-benzoylphenylsulfanyl)phenyl]-2-methyl-2-(4-methylphenylsulfinyl)propane-1-one; and oxime ester-based photo polymerization initiators, such as 2-(O-benzoyloxime)-1-[4-(phenylthio)]-1,2-octanedione; as well as camphorquinone.

As for concrete examples of the thermal radical-polymerization initiator, an organic peroxide, and an azo-based compound, and the like, can be named.

As for concrete examples of the organic peroxide, the following can be given: 1,1-bis(t-butylperoxy)2-methylcyclohexane, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy) cyclohexane, 2,2-bis(4,4-di-butylperoxycyclohexyl) propane, 1,1-bis(t-butylperoxy)cyclododecane, t-hexylperoxy isopropyl monocarbonate, t-butylperoxymaleic acid, t-butylperoxy-3,5,5-trimethylhexanoate, t-butyl peroxylaurate, 2,5-dimethyl-2,5-di(m-toluoylperoxy)hexane, t-butylperoxy isopropyl monocarbonate, t-butylperoxy 2-ethylhexyl monocarbonate, t-hexyl peroxybenzoate, 2,5-dimethyl-2,5-di(benzoylperoxy)hexane, t-butyl peroxyacetate, 2,2-bis(t-butylperoxy)butane, t-butyl peroxybenzoate, n-butyl-4,4-bis(t-butylperoxy)valerate, di-t-butyl peroxyisophthalate, α,α'-bis(t-butylperoxy)diisopropylbenzene, dicumyl peroxide, 2,5-dimethyl-2,5-di(t-butylperoxy)hexane, t-butyl cumyl peroxide, di-t-butyl peroxide, p-menthane-hydroperoxide, 2,5-dimethyl-2,5-di(t-butylperoxy)-3-hexyne, diisopropylbenzene hydroperoxide, t-butyl trimethylsilyl peroxide, 1,1,3,3-tetramethylbutyl hydroperoxide, cumene hydroperoxide, t-hexyl hydroperoxide, and t-butyl hydroperoxide.

As for concrete examples of the azo-based compound, the following can be given: 1,1'-azobis(cyclohexane-1-carbonitrile), 2-(carbamoylazo)isobutyronitrile, 2-phenylazo-4-methoxy-2,4-dimethylvaleronitrile, azo di-t-octane, and azo di-t-butane.

It is also allowable to use one of the above-enumerated radical-polymerization initiators independently, or it is even permissible to use two or more of them combinedly. Moreover, it is also feasible to make the organic peroxides redox catalysts by means of combining them with a reducing agent.

A content proportion of Component (D) in the composition can be from 0.1 to 10 parts by mass, can more preferably be from 0.5 to 5 parts by mass, or can especially preferably be from 1 to 3 parts by mass, with respect to a sum of Component (A), Component (B) and Component (C) being taken as 100 parts by mass.

By setting the content proportion of Component (D) at from 0.1 to 10 parts by mass, the resulting composition becomes one which is excellent in terms of curability, and so protective films are obtainable which are excellent in terms of wear resistance and weatherability.

Component (E)

Ultraviolet Absorber

Component (E) is an ultraviolet absorber, and it is possible to employ various compounds or substances for it.

As for concrete examples of the ultraviolet absorber, the following can be given: triazine-based ultraviolet absorbers, such as 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2-ethylhexyloxy)propyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxy phenyl)-1,3,5-triazine, and 2-(2-hydroxy-4-[1-octyloxycarbonylethoxy]phenyl)-4,6-bis(4-phenylphenyl)-1,3,5-triazine; benzotriazole-based ultraviolet absorbers, such as 2-(2H-benzotriazol-2-yl)-4,6-bis(1-methyl-1-phenyl-ethyl)phenol, 2-(2-hydroxy-5-tert-butylphenyl)-2H-benzotriazole, and 2-[2-hydroxy-5-(2-(meth)acryloyloxyethyl) phenyl]-2H-benzotriazole; benzophenone-based ultraviolet absorbers, such as 2,4-dihydroxybenzophenone, and 2-hydroxy-4-methoxybenzophenone; cyanoacrylate-based ultraviolet absorbers, such as ethyl-2-cyano-3,3-diphenylacrylate, and octyl-2-cyano-3,3-diphenylacrylate; and inorganic fine particles, such as titanium oxide fine particles, zinc oxide fine particles, and tin oxide fine particles, which absorb ultraviolet rays.

It is also allowable to use one of the above-enumerated ultraviolet absorbers independently, or it is even permissible to use two or more of them combinedly.

Of those above, the benzotriazole-based ultraviolet absorbers, which have a (meth)acryloyl group, are especially preferable, from such a viewpoint that they make the weatherability and wear resistance of the resulting protective films compatible with each other.

A content proportion of Component (E) in the composition can be from 1 to 12 parts by mass, or can more preferably be from 3 to 12 parts by mass, with respect to a sum of Component (A), Component (B) and Component (C) being taken as 100 parts by mass.

By setting the content proportion of Component (E) at from 1 to 12 parts by mass, it is possible to make the wear resistance and weatherability of the resulting protective films compatible with each other. When Component (E) is less than 1 part by mass, no protective films, which exhibit weatherability sufficiently, are obtainable. On the other hand, when Component (E) is too much, not only because the wear resistance of the resultant protective films declines, but also because the weatherability also tends to decline, Component (E) is set at 12 parts by mass or less. In particular, by setting the content proportion of Component (E) at from 3 to 12 parts by mass, protective films, in which excellent wear resistance and weatherability are made compatible with each other, are obtainable.

Component (F)

Organic Solvent

Component (F) is a solvent, and it is possible to employ various compounds for it.

As for Component (F), it is preferable to use one which can uniformly disperse or dissolve Component (A), Component (B), Component (C), Component (D) and Component (E), and additionally the other components being described later.

As for concrete examples of preferable solvents, the following can be given: alcohols, such as ethanol, and isopropanol; alkylene glycol monoethers, such as ethylene glycol monomethylether, propylene glycol monomethylether, propylene glycol monoethylether, propylene glycol monopropylether, and propylene glycol monobutylether; aromatic compounds, such as toluene, and xylene; esters, such as propylene glycol monomethylether acetate, ethyl acetate, and butyl acetate; ketones, such as acetone, methyl ethyl ketone, and methyl isobutyl ketone; ethers, such as dibutyl ether; and diacetone alcohol; as well as N-methylpyrrolidone. Of these, the alkylene glycol monoethers, such as propylene glycol monomethylether, are especially preferable, not only because they are excellent in terms of dispersibility or solubility for each of the respective components, but also because, in a case where the resinous substrate, onto which the composition is applied, is made of polycarbonate resins, they do not dissolve the polycarbonate resins.

Moreover, a method is also applicable preferably in which a solvent, such as alcohols or alkylene glycol monoethers, being incapable of dissolving polycarbonate resins, is mixed with another solvent, such as esters or ketones, being capable of dissolving polycarbonate resins so as not to dissolve a resinous substrate being made of polycarbonate resin at the time of application but to melt the resinous substrate's surface on the order of micrometer at a subsequent heating step, thereby enhancing the adhesiveness of the resulting paint films. In addition, another method is applicable preferably as well in which solvents with various boiling points are mixed with each other, thereby enhancing the smoothness or flatness of the resultant paint films' surface.

A content proportion of Component (F) in the composition can be from 10 to 1,000 parts by mass with respect to a sum of Component (A), Component (B) and Component (C) being taken as 100 parts by mass. When a blending amount of Component (F) is too less, it is less likely to carry out coating uniformly; whereas it is less likely to obtain protective films with a sufficient thickness when it is too much. Therefore, the content proportion of Component (F) can preferably be from 50 to 500 parts by mass, or can more preferably be from 50 to 300 parts by mass, when prescribing it daringly, from the standpoint of productivity, although it is advisable to appropriately select the content proportion depending on coating methods.

Note that the content proportion of Component (F) shall involve organic solvents, which are present at the time of preparing the composition along with not only Components (A) through (E) but also later-described Component (G) and Component (H) as well as the other components.

Component (G)

Hindered Amine-Based Light Stabilizer

Although the composition is one to which said Components (A) through (F) are indispensable, it is advisable to further blend a hindered amine-based light stabilizer (G) (hereinafter, being referred to as "Component (G)") in order to upgrade the weatherability.

As for concrete examples of the hindered amine-based light stabilizer, the following hindered amine-based light stabilizers can be given: bis(1,2,2,6,6-pentamethyl-4-piperidinyl) sebacate, methyl(1,2,2,6,6-pentamethyl-4-piperidinyl) sebacate, 2,4-bis[N-butyl-N-(1-cyclohexyloxy-2,2,6,6-tetramethyl-piperidin-4-yl)amino]-6-(2-hydroxyethylamine)-1,3,5-triazine, and decanedioic acid bis(2,2,6,6-tetramethyl-1-(octyloxy)-4-piperidinyl)ester.

Of these, those whose basicity of hindered amine is lower are preferable, from the viewpoint of the resulting composition's stability. To be concrete, those having an aminoether group, namely, so-called NOR-type ones, are more preferable.

A content proportion of Component (G) can preferably be from 0.05 to 1.5 parts by mass, or furthermore from 0.1 to 1.5 parts by mass, with respect to a sum of Component (A), Component (B) and Component (C) being taken as 100 parts by mass.

Component (H)

Surface Modifier

In order to enhance leveling property at the time of applying, or in order to enhance the sliding property of the resulting protective films to enhance the scratch resistance, it is also advisable to further add various surface modifiers to the composition. As for the surface modifiers, it is possible to employ various additives for modifying superficial properties, which are commercially available under such a name as a surface-modifying agent, a leveling agent, a sliding-property imparting agent, or an antifouling-property imparting agent, and the like. Of those, silicone-based surface modifiers, and fluorine-based surface modifiers are suitable.

As for their concrete examples, the following can be given: silicone-based polymers and oligomers, which have a silicone chain and polyalkylene oxide chain; silicone-based polymers and oligomers, which have a silicone chain and polyester chain; fluorine-based polymers and oligomers, which have a perfluoroalkyl group and polyalkylene oxide chain; and fluorine-based polymers and oligomers, which have a perfluoroalkyl ether chain and polyalkylene oxide chain. It is allowable to employ one or more types of these. For the purpose of enhancing and so forth the sustainability of the resulting sliding property, it is also permissible to employ one which contains a (meth)acryloyl group within the molecule.

A preferable blending amount of the surface modifier can be from 0.01 to 1.0 part by mass with respect to a sum of Component (A), Component (B) and Component (C) being taken as 100 parts by mass. By setting the blending amount of the surface modifier at from 0.01 to 1.0 part by mass, it is possible to enhance the superficial flatness or smoothness of the resulting paint films.

Other Components

Although the composition is one to which said Components (A) through (F) are indispensable, it is possible to further blend various components in compliance with objectives. It is also allowable to blend one of aforementioned Component (G), Component (H) and below-enumerated other component independently, or it is even permissible to blend two or more species of them.

For the purpose of making the preservation stability of the composition satisfactory, it is preferable to add a radical-polymerization inhibitor to it.

As for concrete examples of the polymerization inhibitor, the following can be given: hydroquinone, tert-butylhydroquinone, hydroquinone monomethyl ether, 2,6-di-tert-butyl-4-methyl phenol, 2,4,6-tri-tert-butyl phenol, benzoquinone, phenothiazine, N-nitroso phenylhydroxylamine, ammonium salts of N-nitroso phenylhydroxylamine, aluminum salts of N-nitroso phenylhydroxylamine, copper dibutyldithiocarbamate, copper chloride, and copper sulfate.

It is preferable to set an addition amount of the polymerization inhibitor at from 10 to 10,000 ppm, or it can more preferably be from 100 to 3,000 ppm, with respect to a sum of Component (A), Component (B), and Component (C) being taken as 100 parts by mass.

For the purpose of making the heat resistance and weatherability of the resulting protective films satisfactory, it is also advisable to further blend various oxidation inhibitors to the composition. As for some of the oxidation inhibitors, primary oxidation inhibitors, such as hindered phenol-based oxidation inhibitors; and sulfur-based and phosphorous-based secondary oxidation inhibitors can be named.

As for concrete examples of the primary oxidation inhibitors, the following can be given: pentaerythritol tetrakis[3-(3,5-di-tert-butyl-4-hydroxyphenyl)propionate], ethylene bis(oxyethylene)bis[3-(5-tert-butyl-4-hydroxy-m-tolyl)propionate], and 1,3,5-tris[(4-tert-butyl-3-hydroxy-2,6-xylyl)methyl]-1,3,5-triazine-2,4,6(1H,3H,5H)-trione.

As for concrete examples of the secondary oxidation inhibitors, the following can be given: didodecyl 3,3'-thiodipropionate, 4,6-bis(octylthiomethyl)-o-cresol, and tris(2,4-di-tert-butylphenyl)phosphite.

A preferable blending amount of the oxidation inhibitors can be from 0 to 5 parts by mass, or more preferably from 0 to 3 parts by mass, with respect to a sum of Component (A), Component (B) and Component (C) being taken as 100 parts by mass.

It is also advisable to further add a compound, which is other than Component (A) and Component (B) and which has one or more radically-polymerizable unsaturated groups within one molecule, to the composition.

The compound having one radically-polymerizable unsaturated group within one molecule (hereinafter, being referred to as "monofunctional unsaturated compound") can be blended in order to enhance the adhesiveness between the resinous substrate and the resulting protective films.

As for the radically-polymerizable unsaturated group in the monofunctional unsaturated compound, a (meth)acryloyl group is preferable.

As for a blending proportion of the monofunctional unsaturated compound, it is preferable to set it at 20 parts by mass or less with respect to a sum of Component (A), Component (B) and Component (C) being taken as 100 parts by mass, from the standpoint of preventing the resulting wear resistance and weatherability from worsening.

As for concrete examples of the monofunctional unsaturated compound, the following can be given: (meth)acrylic acid, Michael addition-type dimers of acrylic acid, ω-carboxy-polycaprolactone mono(meth)acrylate, monohydroxylethyl phthalate (meth)acrylate, methyl (meth)acrylate, ethyl (meth)acrylate, butyl (meth)acrylate, 2-ethylhexyl (meth)acrylate, benzyl (meth)acrylate, phenyl (meth)acrylate, phenol-alkylene oxide adduct (meth)acrylate, alkylphenol-alkylene oxide adduct (meth)acrylate, cyclohexyl (meth)acrylate, tert-butylcyclohexyl (meth)acrylate, 2-hydroxyethyl (meth)acrylate, 2-hydroxypropyl (meth)acrylate, 4-hydroxybutyl acrylate, paracumylphenol-alkylene oxide adduct (meth)acrylate, orthophenylphenol (meth)acrylate, orthophenylphenol-alkylene oxide adduct (meth)acrylate, tetrahydrofurfuryl (meth)acrylate, isobornyl (meth)acrylate, tricyclodecanemethylol (meth)acrylate, 2-hydroxy-3-phenoxypropyl (meth)acrylate, N-(2-(meth)acryloxyethyl)hexahydrophthalimide, N-(2-(meth)acryloxyethyl)tetrahydrophthalimide, N,N-dimethyl acrylamide, acryloylmorpholine, N-vinylpyrrolidone, and N-vinylcaprolactam.

In the composition, it is also advisable to further blend another compound having two or more radically-polymerizable unsaturated groups within one molecule (hereinafter, being referred to as "multi-functional unsaturated compound"). Including such a multi-functional compound may lead to a case where the adhesiveness between the resulting protective films and the resinous substrate as well as the wear resistance of the resultant protective films can be improved.

It is preferable that a number of the radically-polymerizable unsaturated groups in the multi-functional unsaturated compound can be 3 or more within one molecule, and can more preferably be from 4 to 20, in order not to decline the resulting wear resistance.

As for a blending proportion of the multi-functional unsaturated compound, it is preferable to set it at 20 parts by mass or less with respect to a sum of Component (A), Component (B) and Component (C) being taken as 100 parts by mass, from the standpoint of preventing the resulting weatherability from worsening.

As for the multi-functional unsaturated compound, a compound having two or more (meth)acryloyl groups within one molecule is preferable. As for its concrete examples, the following compounds can be given: bisphenol A-alkylene oxide adduct di(meth)acrylate, bisphenol F-alkylene oxide adduct di(meth)acrylate, bisphenol Z-alkylene oxide adduct di(meth)acrylate, bisphenol S-alkylene oxide adduct di(meth)acrylate, thiobisphenol-alkylene oxide adduct di(meth)acrylate, bisphenol A di(meth)acrylate, bisphenol F di(meth)acrylate, bisphenol Z di(meth)acrylate, bisphenol S di(meth)acrylate, thiobisphenol di(meth)acrylate, tricyclodecanedimethylol di(meth)acrylate, ethylene glycol di(meth)acrylate, polyethylene glycol di(meth)acrylate, propylene glycol di(meth)acrylate, polypropylene glycol di(meth)acrylate, neopentyl glycol di(meth)acrylate, 1,6-hexanediol di(meth)acrylate, 1,9-nonanediol di(meth)acrylate, glycerine di(meth)acrylate, glycerine-alkylene oxide adduct di(meth)acrylate, dimer acid diol di(meth)acrylate, cyclohexanedimethylol di(meth)acrylate, trimethylolpropane tri(meth)acrylate, trimethylolpropane-alkylene oxide adduct tri(meth)acrylate, pentaerythritol tri- and tetra-acrylates, pentaerythritol-alkylene oxide adduct tri- and tetra-acrylates, ditrimethylolpropane tetra(meth)acrylate, dipentaerythritol hexa- and penta-acrylates, polyester (meth)acrylate, epoxy (meth)acrylate, urethane (meth)acrylate, and silicone resins having a (meth)acryloyl group at the ends.

As for the polyester (meth)acrylate, dehydrated condensates between polyester polyol and (meth)acrylic acid can be named. As for the polyester polyol reaction products between low-molecular-weight polyols and dicarboxylic acids and their anhydrides can be named. Moreover, the low-molecular-weight polyols can be ethylene glycol, polyethylene glycol, cyclohexanedimethylol, 3-methyl-1,5-pentanediol, propylene glycol, polypropylene glycol, 1,6-hexanediol, and trimethylolpropane, as well as alkylene oxide adducts of these low-molecular-weight polyols. In addition, the dicarboxylic acids can be adipic acid, succinic acid, phthalic acid, hexahydrophthalic acid, and terephthalic acid. Moreover, dehydrated condensates between various dendrimer-type polyols and (meth)acrylic acid can be named.

As for the epoxy(meth)acrylate, the following can be given: (meth)acrylic acid adducts of bisphenol type-A epoxy resins, (meth)acrylic acid adducts of hydrogenated bisphenol type-A epoxy resins, (meth)acrylic acid adducts of phenol or cresol novolac-type epoxy resins, (meth)acrylic acid adducts of biphenyl-type epoxy resins, (meth)acrylic acid adducts to diglycidyl ether of polyether, such as polytetramethylene glycol, (meth)acrylic acid adducts to diglycidyl ether of polybutadiene, (meth)acrylic acid adducts of internal epoxide in polybutadiene, (meth)acrylic acid adducts of silicone resins having an epoxy group, (meth)acrylic acid adducts of limonene dioxide, and (meth)acrylic acid adducts of 3,4-epoxycyclohexylmethyl-3,4-epoxycyclohexanecarboxylate.

As for the urethane (meth)acrylate, the following can be given: compounds in which organic polyisocyanate and hydroxyl group-containing (meth)acrylate have undergone an addition reaction; and compounds in which organic polyisocyanate, polyol and hydroxyl group-containing (meth)acrylate have undergone an addition reaction.

Here, as for some of the polyols, the following can be given: low-molecular-weight polyols, polyether polyol, polyester polyol, and polycarbonate polyol.

As for some of the low-molecular-weight polyols, the following can be given: ethylene glycol, propylene glycol, neopentyl glycol, cyclohexanedimethylol, 3-methyl-1,5-pentanediol, and glycerin.

As for the polyether polyol, polypropylene glycol, and polytetramethylene glycol can be named.

As for the polyester polyol, reaction products can be named, reaction products which are made between those low-molecular-weight polyols (and/or the polyether polyols) and dicarboxylic acids, such as adipic acid, succinic acid, phthalic acid, hexahydrophthalic acid and terephthalic acid, or their anhydrides.

As for the organic polyisocyanate, the following can be given: tolylene diisocyanate, xylylene diisocyanate, tetramethylxylylene diisocyanate, 4,4'-diphenylmethane diisocyanate, 4,4'-dicyclohexylmethane diisocyanate, hexamethylene diisocyanate, and isophorone diisocyanate.

As for the hydroxyl group-containing (meth)acrylate, the following can be given: hydroxyalkyl (meth)acrylate, such as 2-hydroxyethyl (meth)acrylate, 2-hydroxypropyl (meth)acrylate, and 4-hydroxybutyl (meth)acrylate; or hydroxyl group-containing multi-functional (meth)acrylate, such as pentaerythritol tri(meth)acrylate, and dipentaerythritol penta (meth)acrylate.

It is also allowable to use one of the above-enumerated unsaturated compounds independently, or it is even permissible to use two or more of them combinedly.

For the purpose of reducing warpage at the time of curing while maintaining transparency, and the like, it is also possible to further blend an organic polymer into the composition. As for a suitable polymer, (meth)acryl-based polymers can be named. As for a suitable constituent monomer, the following can be given: methyl (meth)acrylate, cyclohexyl (meth)acrylate, (meth)acrylic acid, glycidyl (meth)acrylate, and N-(2-(meth)acryloxyethyl)tetrahydrophthalimide. In a case where polymers are made by copolymerizing (meth) acrylic acid, it is also advisable to introduce a (meth)acryloyl group into the polymer chain by adding glycidyl (meth)acrylate to it.

Substrate

In the member for vehicle according to the present invention, the resinous substrate is not limited particularly regarding its material quality and configuration. For example, the following can be given: polycarbonate resins, polymethyl methacrylate, polyethylene terephthalate, polyvinyl chloride, epoxy resins, and polyurethane resins. Among them, polycarbonate is preferable. Since polycarbonate exhibits transparency and impact resistance sufficiently, it is suitable as window glasses for vehicle.

Protective Film

The thicker the thickness of the resulting protective films is, the more the weatherability upgrades. However, making it too thick is not desirable, from the appearance of the resultant protective films and from the standpoint of productivity. Taking weatherability, appearance and productivity into consideration, it is desirable that the film thickness of the resulting protective films can be set at from 5 to 50 μm, or furthermore at from 10 to 40 μm.

Note that, in the member for vehicle according to the present invention, excellent adhesiveness can be demonstrated without ever forming any undercoating layer, or the like, between the resinous substrate and the protective film.

Manufacturing Process for Member for Vehicle

Hereinafter, explanations will be made on a manufacturing process for member for vehicle according to the present invention. A manufacturing process for member for vehicle according to the present invention mainly includes a preparation step, an application step, and a curing step.

The preparation step is a step of preparing the above-mentioned composition by setting the respective components at a predetermined blending proportion, respectively. It is possible to produce the composition by weighing Components (A) through (F), which have been explained already, as well as the other components, such as Component (G) and Component (H), if needed, in a predetermined amount, respectively, and then stirring and mixing them.

The application step is a step of applying the composition onto a surface of a resinous substrate partially at least.

It is allowable to follow conventional methods to do a coating method for the composition. For example, the following are preferable: spraying methods, spin coating methods, dip coating methods, bar coating methods, and flow coating methods; and it is permissible to select one of them depending on configurations of the resinous substrate. On this occasion, when the surface of the substrate is made so as not to be exposed to the composition for a long period of time, degradations of the substrate due to organic solvents can be inhibited.

Although a film thickness of the resulting coated films being formed by means of coating depends on a proportion of solid contents being included in the composition, it is advisable to appropriately select the thickness in compliance with a thickness of obtainable protective films. For example, it is allowable to set a film thickness of the resultant coated films (before being dried and cured) at from 6 to 100 μm. Note that, when the post-drying or post-curing thickness is insufficient, it is permissible to further carry out the steps from applying to curing repeatedly.

It is also allowable to further carry out a drying step of drying the coated film between the application step and the curing step. It is advisable to appropriately select a temperature for drying the coated films depending on heat resistance of the resinous substrate, and the temperature can be the softening point of resin or less. For example, in a case where the resinous substrate is made of polycarbonate resin, it is preferable to set the temperature within a range of from 50 to 120° C.

The curing step is a step of curing the composition (or coated films), thereby forming a protective film on the surfaces of the resinous substrate.

In a case where the composition is a light curing-type composition, it is advisable to dry the composition after it is applied onto the resinous substrate, and then to irradiate it with light, such as ultraviolet rays. As for a preferable manufacturing method, it is possible to name a method in which the post-drying resinous substrate is irradiated with light in such a state that it is maintained at high temperatures.

In a case where the composition is a light curing-type composition, as for the temperature when irradiating the composition with an ultraviolet ray, and the like, after drying it, although the temperature shall not be limited especially as far as it is a temperature or less at which the performance of substrate materials can be maintained, it can preferably fall within a range of from 50° C. to 200° C. For example, in the case of polycarbonate resin, it is preferable to set the temperature within a range of from 50 to 120° C., more preferably from 60 to 110° C., much more preferably, from 70 to 100° C., and especially preferably, from 80 to 100° C. By maintaining a temperature of the resinous substrate within a range of from 50 to 120° C. when irradiating it with ultraviolet rays, it is possible to enhance the wear resistance of the resulting protective films.

As for some of the light, although ultraviolet rays and visible rays can be named, ultraviolet rays are preferable especially.

As for some of ultraviolet irradiation devices, high pressure-mercury lamps, metal halide lamps, electrodeless UV lamps, and LEDs can be named. In the case of electrodeless UV lamps, it is possible to suitably employ those of new types, too, that are operated by means of current resulting from direct-current power source.

An irradiation energy shall be set up appropriately depending on the types of active energy rays or the blending compositions. However, the following can be given as one of such examples in a case where a high-pressure mercury lamp is employed: the irradiation energy can preferably be from 100 to 10,000 mJ/cm$^2$, or more preferably, from 1,000 to 6,000 mJ/cm$^2$, by irradiation energy in UV-A region.

In a case where the composition is a thermo curing-type composition, it is advisable to dry the composition after it is applied onto the resinous substrate, and then to heat, it furthermore. As for a heating temperature, although it shall not be limited especially as far as it is a temperature or less at which the performance of substrate materials can be maintained, it can preferably be from 80 to 200° C.

As for a heating time, it can preferably be from 10 minutes or more to 120 minutes or less. When viewing it from the standpoint of productivity, it is advisable to set it at 60 minutes or less, or furthermore at 30 minutes or less.

Note that it is also allowable to carry out the curing of the composition in air, or it is even permissible to carry it out in a vacuum, or in an inert-gas environment. Although it is preferable to carry out the curing in a vacuum, or in an inert-gas atmosphere, in view of prospective performance of the resulting protective films, it is also advisable to carry it out in air, from the viewpoint of productivity.

In the present description, the temperatures for drying and heating are the superficial temperature of coated films, and are virtually equal to an atmospheric temperature in the drying or heating.

As for usage of the member for vehicle according to the present invention, the following can be given: interior/exterior members for vehicle, such as automobile, industrial vehicle, personal vehicle, automotive body being capable of self-propelling, and railroad vehicle; exterior plates for vehicle; and resinous windows.

As for some of the exterior members, the following can be given: door moldings, frameworks for door mirror, wheel covers, spoilers, bumpers, turn-signal lenses, pillar garnishes, rear finishers, and head-lamp covers.

As for some of the interior members, the following can be given: instrument panels, console boxes, meter covers, door-lock bezels, steering wheels, power-window switch bases, center clusters, dashboards, and bonnets.

As for some of the exterior plates, the following can be given: front fenders, door panels, roof panels, hood panels, trunk lids, and back-door panels.

As some of the resinous windows, the following can be given: sunroofs, front glasses, side glasses, rear glasses, rear quarter glasses, and rear-door quarter glasses.

So far, explanations have been made on some of the embodiment modes of the member for vehicle according to the present invention. However, the present invention is not one which is limited to the aforementioned embodiment modes. It is possible to execute the present invention in various modes, to which changes or modifications that one of ordinary skill in the art can carry out are made, within a range not departing from the gist.

EXAMPLES

Hereinafter, examples and comparative examples will be exhibited, thereby explaining the present invention in more detail. Note that the present invention shall not be limited at all by these examples.

In what follows, "parts" means parts by mass, and "%" means % by mass.

Moreover, multi-functional urethane (meth)acrylates, which do not correspond to Component (A), will be hereinafter referred to as Component (A)'. In addition, (meth)acryl-modified colloidal silicas (i.e., involatile components from which dispersion media were got rid of), namely, a silicon-based material that did not correspond to aforementioned Component (C), will be referred to as Component (C)'.

(1) Production Example No. 1

Production of Component (A)

Hdl3-HBA

The following were charged into a 3-L separable flask, which was equipped with a stirring device and an air-blowing tube: an isocyanate compound (e.g., "TPA-100," DURANATE produced by ASAHIKASEI CHEMICALS Co., Ltd., whose NCO content was 23%) whose major component was a nurate-type trimer of hexamethylene diisocyanate in an amount of 1,369.5 g (i.e., 7.5-mol NCO); 1.22-g 2,6-di-tert-butyl-4-methylphenol (hereinafter, being referred to as "BHT"); and 0.73-g dibutyl tin dilaurate (hereinafter, being referred to as "DBTL"). Then, 1,080-g (i.e., 7.5-mol) 4-hydroxybutyl acrylate (hereinafter, being referred to as "HBA") was dropped into them while stirring them at a liquid temperature of from 50 to 75° C.

After completing the dropping, they were further stirred at 80° C. for 4 hours, and their reactions were terminated after confirming the disappearance of isocyanate groups in the resulting reaction product by IR (or infrared absorption) analysis, thereby obtaining an isocyanuric ring-containing urethane (meth)acrylate compound. Hereinafter, this reaction product will be called "HDI3-HBA."

Note that "HDI3-HBA" corresponded to a compound in which all of $R^1$, $R^2$ and $R^3$ were a tetramethylene group, respectively, and all of $R^4$, $R^5$ and $R^6$ were a hydrogen atom, respectively, in said General Formula (1).

(2) Production Example No. 2

Production of Component (A)'

IPDI-M305

The following were charged into a 2-L separable flask, which was equipped with a stirring device and an air-blowing tube: 993-g pentaerythritol tri- and tetra-acrylates (containing tri-acrylate in an amount of 2 mol) (e.g., "M-305," ARONIX produced by TOAGOSEI Co., Ltd., hereinafter being referred to as "M-305"); 0.61-g "BHT"; and 0.36-g "DBTL." Then, 222-g (i.e., 1.0-mol) isophorone diisocyanate (hereinafter, being referred to as "IPDI") was dropped into them while stirring them at a liquid temperature of from 70 to 75° C.

After completing the dropping, they were further stirred at 85° C. for 2 hours, and their reactions were terminated after confirming the disappearance of isocyanate groups in the resulting reaction product by IR (or infrared absorption) analysis, thereby obtaining a multi-functional urethane acrylate.

Hereinafter, this reaction product will be called "IPDI-M305."

(3) Production Example No. 3

Production of Component (C)

Mac-TQ

After charging 150-g1-propanol for alcohol exchange reaction and 36.53-g (i.e., 0.24-mol) tetramethoxy silane (hereinafter, being referred to as "TMOS") into a reactor being equipped with a stirrer and a thermometer, 4.37-g methanol solution of 25%-by-mass tetramethylammonium hydroxide (i.e., 0.1-mol methanol, and 12-millimol tetramethylammonium hydroxide) was added to those above gradually while stirring them, and was reacted with them at a temperature of 25° C. under pH 9 for 6 hours. Thereafter, their internal temperature was set at 60° C., and then they were further reacted for another one hour while stirring them. Note herein that, when the reaction liquid was analyzed by gas chromatography with TCD detector, the following were detected: compounds, in which the methoxy groups of the "TMOS" were replaced by a n-propoxy group, respectively (from monosubstituted product to tetrasubstituted product); and the unreacted "TMOS." Moreover, the "TMOS" was detected only in a trace amount. Of these, a proportion of compounds containing a n-propoxy group was virtually 100% in total. Based on a peak area of the products in gas chromatography, a substitution number of 1-propanol (i.e., an averaged number of n-propoxy groups per one molecule of the n-propoxy group-containing compounds) was found to be 2.7.

Next, 59.62-g (i.e., 0.24-mol) 3-methacryloxypropyl trimethoxysilane was added to the aforementioned reaction liquid, and 30.2-g water was further added to it. And, 7.88-g methanol solution of 25% tetramethylammonium hydroxide (i.e., 0.18-mol methanol, and 21.6-millimol tetramethylammonium hydroxide) was further added to the reaction liquid, and was reacted with it at a temperature of 25° C. under pH 9 for 24 hours while stirring it. Thereafter, 22.2-g (i.e., 35.3-millimol) aqueous solution of 10%-by-mass nitric acid was added to neutralize the reaction liquid. Subsequently, the resulting neutralized liquid was added into a mixed liquid of 120-g diisopropyl ether and 180-g water in order to carry out extraction. Salts and excessive acid were removed by washing the resultant diisopropyl ether layer with water. Thereafter, an aluminum salt of N-nitroso phenylhydroxylamine (e.g., "Q-1301 (trade name)" produced by WAKO JUNYAKU KOGYO, Co., Ltd.), which served as a polymerization inhibitor, was added to the diisopropyl ether layer in an amount of 11.5 mg. The organic solvents were distilled away from the thus obtained diisopropyl ether solution under decompression, thereby obtaining an organosilicon compound as a colorless transparent solid. Its yield was 57.72 g.

The organosilicon compound was analyzed by $^1$H-NMR, and it was then ascertained that the thus obtained organosilicon compound was a copolycondensate that was obtained by reacting 3-methacryloxypropyl trimethoxysilane and tetrapropoxy silane stoichiometrically.

A content proportion of alkoxy group (i.e., n-propoxy group being bonded to silicon atom), which was calculated from a $^1$H-NMR chart of the organosilicon compound, was such an amount that was equivalent to 2.5% with respect to the entirety of alkoxy groups that were included in the charged raw materials. Moreover, the $M_n$ was 9,600. Hereinafter, this reaction product will be called "Mac-TQ."

Preparation of Light Curing-Type Coating-Agent Compositions

An ordinary method was followed to stir and then mix components shown in Table 1 and Table 3, thereby producing light curing-type coating-agent compositions (i.e., Compositions #E1 through E4, and Compositions #C1 through C8).

Note that numeric values of the respective components in Table 1 and Table 3 are expressed as the numbers of parts by mass. Moreover, abbreviations in the tables express the following compounds.

Abbreviations (i) Component (A)
"HDI3-HBA": Reaction Product according to Production Example No. 1

(ii) Component (A)'
"IPDI-M305": Reaction Product according to Production Example No. 2

(iii) Component (B)
"M-315": "M-315," ARONIX produced by TOAGOSEI Co., Ltd., i.e., tris(acryloyloxyethyl)isocyanurate, corresponding to a compound wherein: $R^7$, $R^8$ and $R^9$ is an ethylene group, respectively; $R^{10}$, $R^{11}$ and $R^{12}$ is a hydrogen atom, respectively; $n^1$, $n^2$ and $n^3$ is 1, respectively; and $n^1+n^2+n^3=3$ in said General Formula (2);

(iv) Component (C)
"Mac-TQ": Reaction Product according to Production Example No. 3;

(v) Component (C)'
"Acryl-Silica": Nonvolatile Component in methyl ethyl ketone (hereinafter, being referred to as "MEK")-dispersion Acryl-modified Colloidal Silica, a product of NISSAN CHEMICAL INDUSTRIES, Ltd., under Trade Name of "MEK-AC-2101" exhibiting an average particle diameter of from 10 to 15 nm (e.g., values being calculated from the specific surface areas according to the BET method), having solid contents in an amount of 33%, and containing "MEK" in an amount of 67%;

(vi) Component (D)
"Irg-819": Photo Radical-polymerization initiator produced by BASF Co., Ltd., under Trade Name of "IRGACURE 819," namely, bis(2,4,6-trimethylbenzoyl)-phenylphosphine oxide;

(vii) Component (E)
"RUVA-93": Benzotriazole-based Ultraviolet Absorber having a methacryloyl group, a product of OTSUKA KAGAKU Co., Ltd., under Trade Name of "RUVA-93," namely, 2-[2-hydroxy-5-(2-methacryloyloxyethyl)phenyl]-2H-benzo triazole;

(viii) Component (F)
"PGM": Propylene Glycol Monomethylether; and
"MEK": methyl ethyl ketone (or "MEK" in "MEK-AC-2101" according to said Component (C)');

(ix) Component (G)
"T-123": Hindered Amine-based Light Stabilizer, a product of BASF Co., Ltd., under Trade Name of "TINUVIN 123," namely, decanedioic acid bis(2,2,6,6-tetramethyl-1-(octyloxy)-4-piperidinyl)ester; and (x) Component (H)
"8019add": Silicone-based Surface Modifier (or leveling agent), a product of DOW CORNING TORAY Co., Ltd., under Trade Name of "8019 ADDITIVE," with 100% Effective Ingredient Note that the colloidal silica's average particle diameter is an average primary particle diameter, and the phrase, "from 10 to 15 nm," is a catalogue value for which the dispersions or variations between the product's lots are taken into account.

Structures of effective ingredients in Component (E) and Component (G) are illustrated below.

(Chemical Formula 7)

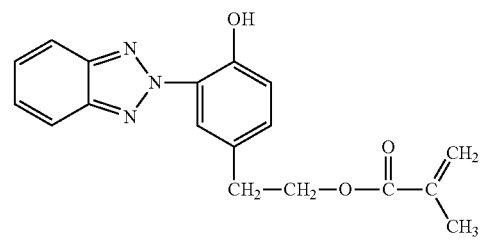

(RUVA-93)

(Chemical Formula 8)

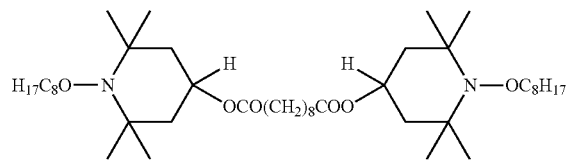

(T-123)

Making of Protective Films

Compositions shown in Table 1 and Table 3 were applied onto a surface of a 10-cm square polycarbonate resin plate, respectively, using a bar coater so that a post-drying paint-film thickness became about 15 µm. After drying the resulting paint films at 100° C. for 10 minutes using a hot-air dryer, an ultraviolet irradiation operation was immediately carried out onto the paint films whose paint-film superficial temperature was 90° C., thereby making samples (i.e., Example Nos. 1 through 5, and Comparative Example Nos. 1 through 8) each of which was equipped with a protective film on one of the opposite surfaces of the resin plate.

For the ultraviolet irradiation operation, a high-pressure mercury lamp produced by EYE GRAPHICS Co., Ltd. was employed. The lamp output, lamp height and conveyor speed were adjusted so as to make the peak illumination intensity 400 mW/cm$^2$, and so as to make the irradiation energy per one pass 250 mJ/cm$^2$ in the region of UV-A according to UV POWER PUCK produced by EIT Corp., and the lamp was then put into operation to irradiate the cured films with ultraviolet rays for 12 passes (i.e., 3,000 mJ/cm$^2$ in total).

For the obtained protective films, the transparency, (initial) adhesiveness, wear resistance, and weatherability (e.g., weathered adhesiveness and presence or absence of cracks)

were evaluated by methods being described below. Those evaluation results are given in Table 2 and Table 4.

(I) Initial Adhesiveness

The cured films were provided with 11 slits by cutting at intervals of 2 mm onto each of the longitudinal and lateral sides using a cutter knife, thereby forming 100 grid-shaped square elements, respectively. Thereafter, pursuant to JIS K5400, a cellophane tape produced by NICHIBAN Co., Ltd. was stuck onto the grid-shaped square elements, and then the cellophane tape was peeled off, respectively. The adhesiveness was evaluated by a proportion of residual films after peeling off the cellophane tape (that is, a number of remained grid-shaped square elements (units: %)).

(II) Transparency

Pursuant to JIS K7136, the haze H (%) of the cured films was measured for every substrate using "NDH-2000," a turbidimeter produced by NIHON DENSHOKU KOGYO. The smaller the H value was, the more satisfactorily the transparency was evaluated.

(III) Wear Resistance

A Taber-type wear test was carried out in compliance with ASTM D-1044. The wear resistance was evaluated by measuring the haze difference ΔH (%) between the values before and after the Taber-type wear test in which a Taber-type wear tester was employed. Note herein that the wear wheel was CS-10F, each of the loads was set at 500 g, and the number of rotations was set at 500 times. The smaller the ΔH (%) was, the more satisfactorily the wear resistance was evaluated.

(IV) Weatherability

Pursuant to JIS K5400, an accelerated test was carried out for 5,000 hours using a carbon arc-type sunshine weatherometer, thereby evaluating the adhesiveness (or weathered adhesiveness) and the presence or absence of cracks for every 500 hours. Note that the adhesiveness was judged to be satisfactory in the protective films from which the protective film was not peeled off when a cellophane tape was stuck onto and then peeled off from the post-accelerated-test protective film. Moreover, regarding the cracks, those in which no cracks were discovered by visual observation were judged to be satisfactory. The results are shown in Table 2 and Table 4. In the respective tables, there are set forth the numbers of the longest time of the testing times in the accelerated test being carried out for protective films that were ascertained to be satisfactory with regard to the adhesiveness and cracks. Those with a greater number of hours were evaluated to be more satisfactory in terms of the weatherability. Regarding those which received a satisfactory evaluation after the accelerated test for 5,000 hours, they are noted by a symbol, "5000<," respectively.

As shown in Table 2, the samples according to Example Nos. 1 through 5 were excellent in terms of the transparency, adhesiveness, wear resistance and weatherability. Of these, Example No. 1 being made by using #E1 exhibited such satisfactory weathered adhesiveness as 5,000 hours. Moreover, Example No. 2 being made by using #E2, in which the amount of Component (B) in #E1 was increased from 15 parts to 30 parts and the amount of Component (A) was reduced by that extent, exhibited such weathered adhesiveness that was upgraded up to exceeding 5,000 hours, and exhibited more upgraded wear resistance as well. Example No. 3 being made by using #E3, in which the amount of Component (B) was further increased up to 50 parts, exhibited more upgraded wear resistance, and was excellent exceptionally in terms of the weatherability in the same manner as Example No. 2.

When the amount of the UV absorber serving as Component (E) was increased like #E4 in order to maintain the weathered adhesiveness in a case where the coated thickness became thinner, the wear resistance of Example No. 4 declined slightly, but was at a satisfactory level. Note herein that, when the amount of Component (C) was increased up to 25 parts as did in #E5, the weathered adhesiveness of Example No. 5 declined a little, but the wear resistance upgraded greatly.

On the contrary, Comparative Example No. 1 being made by using #C1, which did not include any Component (A) but in which Component (B) was present excessively, exhibited poorer weathered adhesiveness, as shown in Table 4. Moreover, Comparative Example No. 2 being made by using #C2, which did not include any Component (B), exhibited faulty initial adhesiveness. Comparative Example No. 3 being made by using #C3, which did not include any Component (C), exhibited faulty wear resistance. Comparative Example No. 4 being made by using #C4, which did not include any Component (E), exhibited worse weatherability. In Comparative Example No. 5 being made by using #C5 in which Component (C) was blended excessively, the wear resistance was satisfactory, however, the weatherability had worsened greatly. As described above, it was important to blend Component (A), Component (B), Component (C) and Component (E) in an appropriate amount, respectively.

Although Comparative Example No. 6 in Table 4 was made by using #C6 which employed a multi-functional urethane acrylate (i.e., Component (A)') whose wear resistance was satisfactory even when it did not include any inorganic fine particles, the weatherability was faulty.

Comparative Example No. 7 being made by using #C7, in which that Component (A)', instead of Component (C), was employed as a wear-resistance improving agent, was faulty not only in terms of the wear resistance but also in terms of the weatherability.

Although Comparative Example No. 8 in Table 4 was made by using #C8, in which Component (C)' (or "Acryl-Silica") substituted for Component (C) (or "Mac-TQ") in 14E4, the wear resistance was satisfactory, however, the weathered adhesive was poorer.

TABLE 1

| Composition No. | | #E1 | #E2 | #E3 | #E4 | #E5 |
|---|---|---|---|---|---|---|
| (A) | HDI3-HBA | 70 | 55 | 35 | 35 | 45 |
| (B) | M-315 | 15 | 30 | 50 | 50 | 30 |
| (C) | Mac-TQ | 15 | 15 | 15 | 15 | 25 |
| (D) | Irg-819 | 2 | 2 | 2 | 2 | 2 |
| (E) | RUVA-93 | 5 | 5 | 5 | 7.5 | 7.5 |
| (F) | PGM | 110 | 110 | 110 | 110 | 110 |
| (G) | T-123 | 0.5 | 0.5 | 0.5 | 0.5 | 0.5 |
| (H) | 8019add | 0.1 | 0.1 | 0.1 | 0.1 | 0.1 |

TABLE 2

| | | Sample No. | | | | |
|---|---|---|---|---|---|---|
| | | #01 | #02 | #03 | #04 | #05 |
| | | Composition No. | | | | |
| | | #E1 | #E2 | #E3 | #E4 | #E5 |
| Initial State | Transparency, H (%) | 0.3 | 0.3 | 0.3 | 0.3 | 0.3 |
| | Adhesiveness, Residual Film (%) | 100 | 100 | 100 | 100 | 100 |
| Wear Resistance, Δ H (%) | | 9.7 | 8.9 | 7.9 | 9.5 | 6.8 |
| Weatherability | Adhesiveness (hour) | 5000 | 5000< | 5000< | 5000< | 4500 |
| | Cracks (hour) | 5000< | 5000< | 5000< | 5000< | 5000< |

TABLE 3

| Composition No. | | #C1 | #C2 | #C3 | #C4 | #C5 | #C6 | #C7 | #C8 |
|---|---|---|---|---|---|---|---|---|---|
| (A) | HDI3-HBA | | 85 | 70 | 55 | 30 | | 20 | 35 |
| (A)' | IPDI-M305 | | | | | | 100 | 50 | |
| (B) | M-315 | 85 | | 30 | 30 | 30 | | 30 | 50 |
| (C) | Mac-TQ | 15 | 15 | | 15 | 40 | | | |
| (C)' | Acryl-Silica | | | | | | | | 15 |
| (D) | Irg-819 | 2 | 2 | 2 | 2 | 2 | 2 | 2 | 2 |
| (E) | RUVA-93 | 5 | 5 | 5 | | 5 | 5 | 5 | 7.5 |
| (F) | PGM | 110 | 110 | 110 | 110 | 110 | 110 | 110 | 80 |
| | MEK | | | | | | | | 30 |
| (G) | T-123 | 0.5 | 0.5 | 0.5 | 0.5 | 0.5 | 0.5 | 0.5 | 0.5 |
| (H) | 8019add | 0.1 | 0.1 | 0.1 | 0.1 | 0.1 | 0.1 | 0.1 | 0.1 |

TABLE 4

| | | Sample No. | | | | | | | |
|---|---|---|---|---|---|---|---|---|---|
| | | #21 | #22 | #23 | #24 | #25 | #26 | #27 | #28 |
| | | Composition No. | | | | | | | |
| | | #C1 | #C2 | #C3 | #C4 | #C5 | #C6 | #C7 | #C8 |
| Initial State | Transparency, H (%) | 0.3 | 0.3 | 0.3 | 0.3 | 0.3 | 0.3 | 0.3 | 0.3 |
| | Adhesiveness, Residual Film (%) | 100 | 0 | 100 | 100 | 100 | 100 | 100 | 100 |
| Wear Resistance, Δ H (%) | | 8.5 | 11.1 | 15.5 | 7.1 | 6.2 | 7.3 | 13.3 | 6.8 |
| Weatherability | Adhesiveness (hour) | 2500 | — | 5000< | 1000 | 2500 | 2000 | 3000 | 4000 |
| | Cracks (hour) | 5000< | — | 5000< | 3000 | 3000 | 2500 | 3500 | 5000< |

*Note that no weatherability test was conducted for #22 because it exhibited worse initial adhesiveness.

Window Glass for Automobile

A concrete embodiment, in which a member for vehicle according to the present invention is used as a window glass (e.g., sunroof) for automobile, will be hereinafter explained using FIG. 1 and FIG. 2.

FIG. 1 is a perspective diagram that schematically illustrates the sunroof. The sunroof comprises a window glass 1, a sash-shaped frame 4 that supports the peripheral portion of the window glass 1. To the peripheral portions of the window glass 1 and frame 4, a loop-shaped weather strip 5, which is formed from a flexible material, is fitted in order to secure air tightness within the automobile. This sunroof is disposed so as to be openable and closable to an opening that is formed in a roof panel of the automobile.

Figure 2:
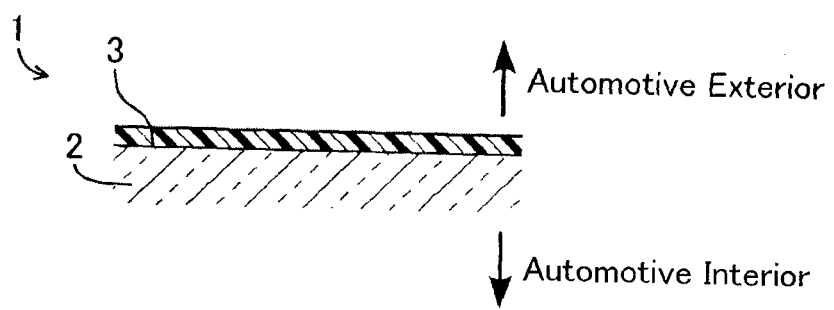
FIG. 2 is a cross-sectional diagram that illustrates a window glass, one of members for vehicle according to the present invention.

FIG. 2 is a cross-sectional diagram that schematically illustrates the window glass 1. The window glass 1 comprises a glass body 2, which is made of polycarbonate, and a protective film 3, which is formed on the automobile exterior-side surface of the glass body 2 at least. The protective film 3 is made by means of curing any one of Compositions #E1 through #E5 by the above-mentioned procedure.

The invention claimed is:
1. A member for vehicle,
comprising a resinous substrate, and a protective film being formed at least partially on a surface of the resinous substrate;
said protective film is formed by curing a curable coating-agent composition containing:
Component (A) in an amount of from 20 to 80 parts by mass;
Component (B) in an amount of from 10 to 70 parts by mass;

Component (C) in an amount of from 5 to 35 parts by mass;
a radical-polymerization initiator serving as Component (D) in an amount of from 0.1 to 10 parts by mass;
an ultraviolet absorber as Component (E) in an amount of from 1 to 12 parts by mass; and
an organic solvent as Component (F) in an amount of from 10 to 1,000 parts by mass;
with respect to a sum of the Component (A), the Component (B) and the Component (C) being taken as 100 parts by mass,
wherein Component (A) is an isocyanuric ring-containing urethane (meth)acrylate compound being expressed by the following Formula (1):

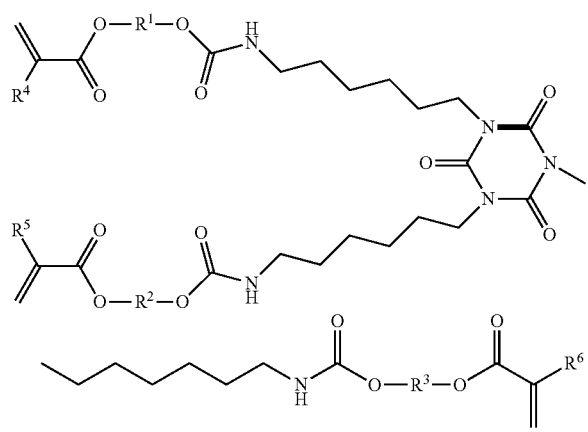

(1)

in Formula (1), each of $R^1$, $R^2$ and $R^3$ is a divalent organic group whose number of carbon atoms is from 2 to 10 independently; and each of $R^4$, $R^5$ and $R^6$ is a hydrogen atom, or a methyl group independently;
wherein Component (B) is an isocyanuric ring-containing tri(meth)acrylate compound being free from any urethane bond that is expressed by the following Formula (2):

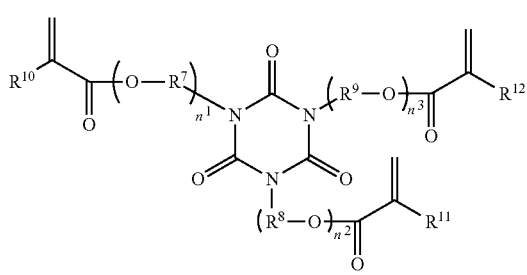

(2)

in Formula (2), each of $R^7$, $R^8$ and $R^9$ is a divalent organic group whose number of carbon atoms is from 2 to 10 independently; each of $R^{10}$, $R^{11}$ and $R^{12}$ is a hydrogen atom, or a methyl group independently; each of $n^1$, $n^2$ and $n^3$ is a number of from 1 to 3 independently; and $n^1+n^2+n^3$=from 3 to 9; and
wherein Component (C) is an organosilicon compound formed by subjecting a silicon compound (c1) being expressed by the following Formula (3) and another silicon compound (c2) being expressed by the following Formula (4) to hydrolytic copolycondensation in a proportion of from 0.3 to 1.8 mol of the compound (c2) with respect to 1 mol of the compound (c1);

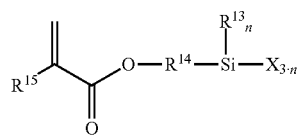

(3)

in Formula (3), $R^{13}$ is an organic group having an alkyl group whose number of carbon atoms is from 1 to 6, an aralkyl group whose number of carbon atoms is from 7 to 10, or an aryl group whose number of carbon atoms is from 6 to 10; $R^{14}$ is a divalent saturated hydrocarbon group whose number of carbon atoms is from 1 to 6; $R^{15}$ is a hydrogen atom, or a methyl group; "X" is a hydrolyzable group; "X"s can be identical with each other, or can be distinct from one other; and "n" is 0 or 1;

$$SiY_4 \qquad (4)$$

in Formula (4), "Y" is a siloxane-bond generation group; and "Y"s may be identical with each other, or may be distinct from one other.

2. The member for vehicle as set forth in claim 1, wherein said Compound (E) includes a benzotriazole-based ultraviolet absorber having a (meth)acryloyl group.

3. The member for vehicle as set forth in claim 1, wherein $R^1$, $R^2$ and $R^3$ are a tetramethylene group, respectively; and $R^4$, $R^5$ and $R^6$ are a hydrogen atom, respectively in Formula (1) for said Component (A).

4. The member for vehicle as set forth in claim 1, wherein $R^7$, $R^8$ and $R^9$ are an ethylene group, respectively; $R^{10}$, $R^{11}$ and $R^{12}$ are a hydrogen atom, respectively; $n^1$, $n^2$ and $n^3$ are 1, respectively; and $n^1+n^2+n^3$=3 in Formula (2) for said Component (B).

5. The member for vehicle as set forth in claim 1 further containing a hindered amine-based light stabilizer serving as Component (G) in an amount of from 0.05 to 1.5 parts by mass with respect to a sum of said Component (A), said Component (B) and said Component (C) being taken as 100 parts by mass.

6. The member for vehicle as set forth in claim 1 further containing a silicone-based and/or fluorine-based surface modifier serving as Component (H) in an amount of from 0.01 to 1.0 part by mass with respect to a sum of said Component (A), said Component (B) and said Component (C) being taken as 100 parts by mass.

7. The member for vehicle as set forth in claim 1, wherein said Component (D) is a photo radical-polymerization initiator.

8. The member for vehicle as set forth in claim 1, wherein:
in said Component (C);
said silicon compound (c1) is a compound whose "X" is an alkoxy group and "n" is zero in Formula (3); and
said silicon compound (c2) has "Y" being an alkoxy group in Formula (4).

9. The member for vehicle as set forth in claim 1, wherein said Component (C) is an organosilicon compound being obtainable by subjecting said silicon compound (c1) and said silicon compound (c2) to hydrolytic copolycondensation under an alkaline condition.

10. The member for vehicle as set forth in claim 1, wherein said protective film makes contact with a surface of said resinous substrate directly.

11. The member for vehicle as set forth in claim 1 being a resinous window for vehicle.

12. The member for vehicle as set forth in claim 1 being an interior/exterior member for vehicle.

13. A manufacturing process for a member for a vehicle being excellent in terms of weatherability and wear resistance, the manufacturing process comprising:
preparing a curable coating-agent composition containing:
Component (A) in an amount of from 20 to 80 parts by mass;
Component (B) in an amount of from 10 to 70 parts by mass;
Component (C) in an amount of from 5 to 35 parts by mass;
a radical-polymerization initiator serving as Component (D) in an amount of from 0.1 to 10 parts by mass;
an ultraviolet absorber serving as Component (E) in an amount of from 1 to 12 parts by mass; and
an organic solvent serving as Component (F) in an amount of from 10 to 1,000 parts by mass;
with respect to a sum of the Component (A), the Component (B) and the Component (C) being taken as 100 parts by mass;
applying said curable coating-agent composition at least partially onto a surface of a resinous substrate; and
curing said curable coating-agent composition, thereby forming a protective film on the surface of said resinous substrate,
wherein Component (A) is an isocyanuric ring-containing urethane (meth)acrylate compound being expressed by the following Formula (1):

(Chemical Formula 4)

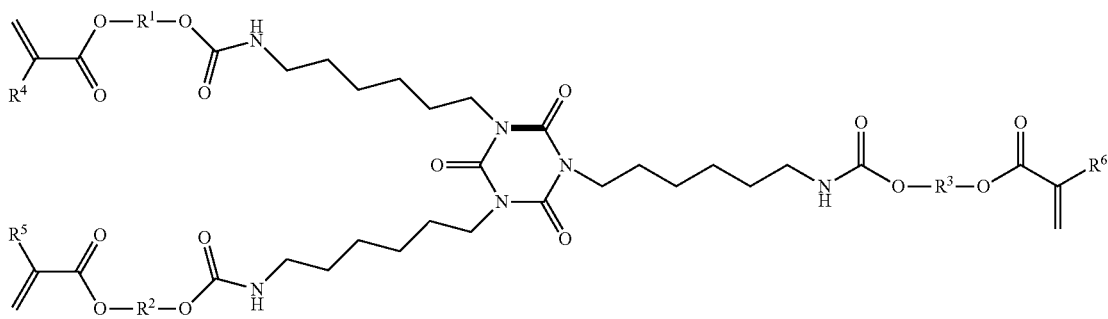

(1)

in Formula (1), each of $R^1$, $R^2$ and $R^3$ is a divalent organic group whose number of carbon atoms is from 2 to 10 independently; and each of $R^4$, $R^5$ and $R^6$ is a hydrogen atom, or a methyl group independently;
wherein Component (B) is an isocyanuric ring-containing tri(meth)acrylate compound being free from any urethane bond that is expressed by the following Formula (2):

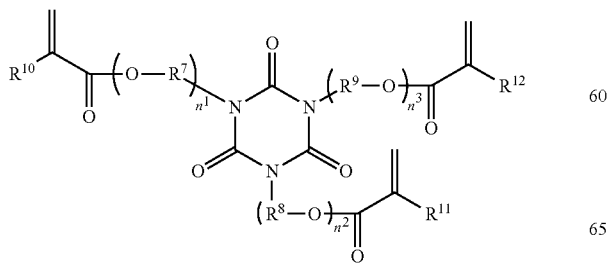

(2)

in Formula (2), each of $R^7$, $R^8$ and $R^9$ is a divalent organic group whose number of carbon atoms is from 2 to 10 independently; each of $R^{10}$, $R^{11}$ and $R^{12}$ is a hydrogen atom, or a methyl group independently; each of $n^1$, $n^2$ and $n^3$ is a number of from 1 to 3 independently; and $n^1+n^2+n^3$=from 3 to 9; and wherein Component (C) is an organosilicon compound formed by subjecting a silicon compound (c1) being expressed by the following Formula (3) and another silicon compound (c2) being expressed by the following Formula (4) to hydrolytic copolycondensation in a proportion of from 0.3 to 1.8 mol of the compound (c2) with respect to 1 mol of the compound (c1):

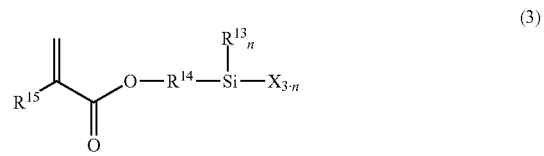

(3)

in Formula (3), $R^{13}$ is an organic group having an alkyl group whose number of carbon atoms is from 1 to 6, an aralkyl group whose number of carbon atoms is from 7 to 10, or an aryl group whose number of carbon atoms is from 6 to 10; $R^{14}$ is a divalent saturated hydrocarbon group whose number of carbon atoms is from 1 to 6; $R^{15}$ is a hydrogen atom, or a methyl group; "X" is a hydrolyzable group; "X"s can be identical with each other, or can be distinct from one other; and "n" is 0 or 1;

$$SiY_4 \qquad (4)$$

in Formula (4), "Y" is a siloxane-bond generation group; and "Y"s may be identical with each other, or may be distinct from one other.

* * * * *